(12) United States Patent
Corbett

(10) Patent No.: US 8,640,465 B2
(45) Date of Patent: Feb. 4, 2014

(54) COMBINED HEAT, ICE, POWER, AND STEAM SYSTEM

(75) Inventor: Scot Corbett, Lenox, GA (US)

(73) Assignee: Anagenesis Trees Corporation, Voorhees, NJ (US)

( * ) Notice: Subject to any disclaimer, the term of this patent is extended or adjusted under 35 U.S.C. 154(b) by 1164 days.

(21) Appl. No.: 12/494,402

(22) Filed: Jun. 30, 2009

(65) Prior Publication Data

US 2010/0000225 A1 Jan. 7, 2010

Related U.S. Application Data

(60) Provisional application No. 61/078,128, filed on Jul. 3, 2008.

(51) Int. Cl.
| | |
|---|---|
| F02C 3/30 | (2006.01) |
| F02C 7/08 | (2006.01) |
| F02G 1/00 | (2006.01) |
| F02G 3/00 | (2006.01) |
| F02C 6/04 | (2006.01) |
| F02C 6/00 | (2006.01) |

(52) U.S. Cl.
USPC ............. 60/775; 60/39.5; 60/784; 60/801

(58) Field of Classification Search
USPC .......... 60/39.182, 728, 775, 39.53, 39.5, 784, 60/801; 203/19
See application file for complete search history.

(56) References Cited

U.S. PATENT DOCUMENTS

| | | | | |
|---|---|---|---|---|
| 4,746,610 | A | * | 5/1988 | Smith ........................ 435/161 |
| 5,457,951 | A | * | 10/1995 | Johnson et al. ............... 60/780 |
| 5,617,716 | A | * | 4/1997 | Schreiber et al. ............ 60/775 |
| 6,050,083 | A | * | 4/2000 | Meckler .................. 60/39.182 |
| 6,651,443 | B1 | * | 11/2003 | Meckler ......................... 60/783 |
| 8,020,406 | B2 | * | 9/2011 | Vandor et al. ................ 62/613 |
| 2004/0011057 | A1 | * | 1/2004 | Huber ............................. 60/781 |
| 2005/0080146 | A1 | * | 4/2005 | Abbott et al. ................ 518/703 |

OTHER PUBLICATIONS

International Search Report issued in connection with International Application No. PCT/US2009/049647 filed Jul. 30, 2009.

* cited by examiner

Primary Examiner — William H Rodriguez
Assistant Examiner — William Breazeal
(74) Attorney, Agent, or Firm — Coats & Bennett, P.L.L.C.

(57) ABSTRACT

A power generation plant generates electrical power to be distributed to consumers via a power grid. The plant also provides some of the power to a fuel processing facility that provides fuel for the plant, and re-cycles the by-products of the power generation process to provide at least some of the resources the plant uses to generate the electrical power.

17 Claims, 1 Drawing Sheet

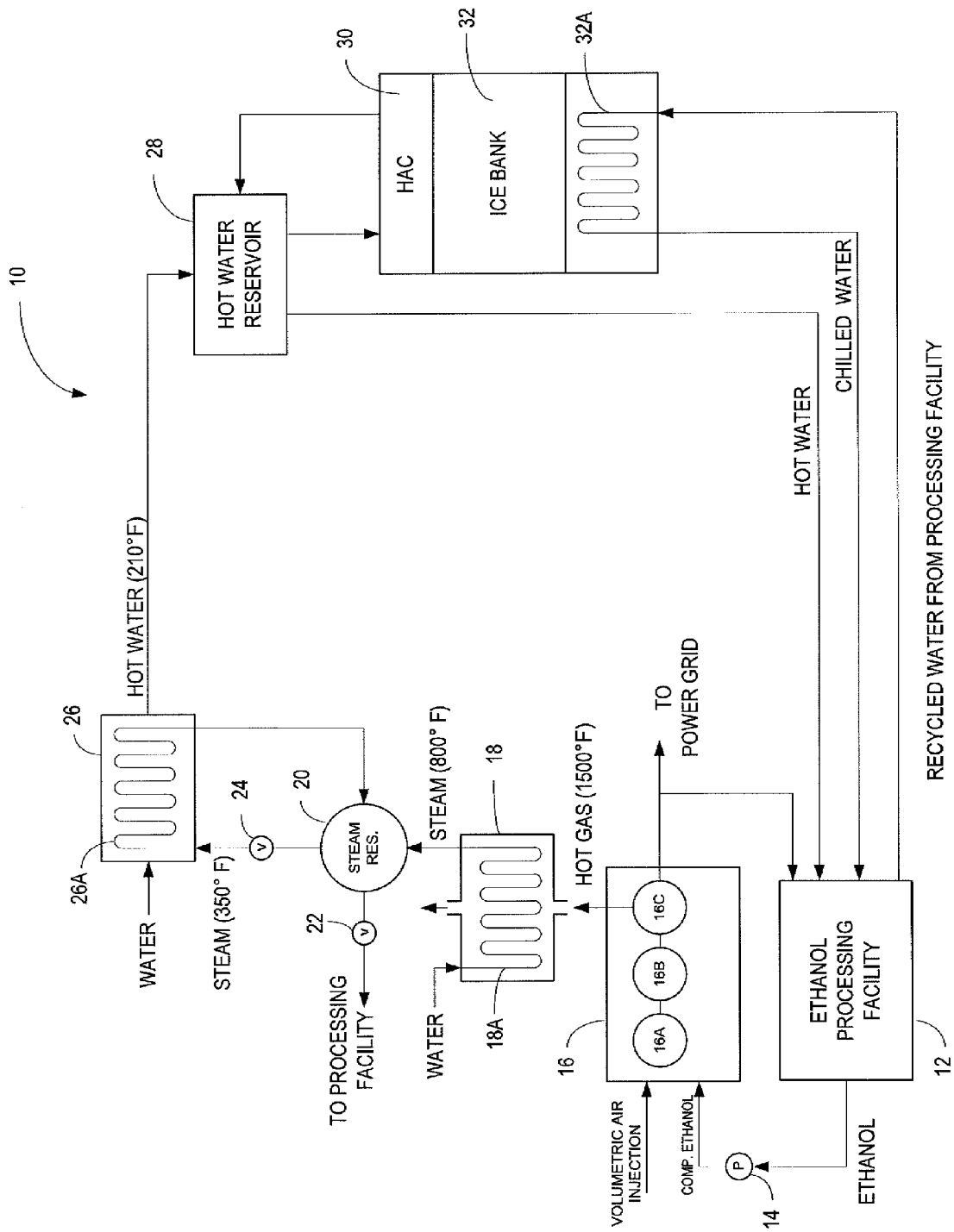

COMBINED HEAT, ICE, POWER, AND STEAM SYSTEM

RELATED APPLICATIONS

This application claims priority from the Provisional U.S. Application having Ser. No. 61/078,128. The '128 provisional application, which is entitled "Combined Heat, Ice, Power, and Steam System," was filed on Jul. 3, 2008 and is expressly incorporated herein by reference in its entirety.

TECHNICAL FIELD

The present invention relates generally to power generation plants, and particularly to power generation plants that re-capture by-products for use in generating their resources.

BACKGROUND

The rising costs of energy are causing serious problems. For example, the cost of generating power for use in homes and businesses has soared because many power plants rely on crude oil to generate power. As most people know, crude oil is expensive and the cost continues to rise. There is little likelihood of relief from such high prices thanks to a weak currency and a strong global demand for crude oil. Additionally, there are many environmental concerns that are inherently involved with the use of crude oil. These include, but are not limited to, pollution and spills.

One solution is to employ alternative fuels, such as ethanol, to power the generation plants. Ethanol burns cleaner, and thus, does not generate the same types of pollution concerns that crude oil does. Ethanol-based power generation plants, however, can still be costly. One way to reduce the costs is to re-capture some of the by-products of producing that energy and use it to provide resources for the power generation plant.

SUMMARY

The present invention provides a system for a power generation plant that uses some of the by-products generated by the power generation plant to produce at least some of the resources it needs to generate electrical power.

In one embodiment, the system comprises a generator subsystem, a hot-water subsystem, and a chilled-water subsystem. The generator subsystem receives a combustible fuel, such as ethanol, for example, from a fuel processing facility. A pump compresses the fuel and mixes it with another compressed gas, such as oxygen, before injecting the mixture into a generator. The generator then ignites the gas mixture and uses the expanding gasses to operate a turbine to generate electricity.

The hot-water subsystem comprises a pair of heat exchangers. A first heat exchanger is connected to the generator and receives the hot exhaust gasses from the generator. The first heat exchanger uses the hot exhaust gasses to convert water received from the fuel processing center to steam, which is stored in a steam reservoir. A portion of that steam may be provided to the fuel processing center on demand, however, the remainder of the steam is carried through a second heat exchanger. Using water received from the fuel processing facility, the second heat exchanger converts the steam to hot water for storage in a hot water reservoir.

A portion of the hot water in the reservoir is provided to the fuel processing facility on demand. However, the remainder is used by the chilled-water subsystem to produce chilled water for use at the fuel processing facility. The chilled-water subsystem comprises a refrigeration unit having an ice bank. A compressor uses the hot water in the hot water reservoir to maintain the ice in the ice bank in a frozen state. A conduit extends through the ice bank and carries water from the fuel processing facility. As the water travels through the conduit in the ice bank, the ice chills the water. The chilled water is then returned to the fuel processing facility through the conduit.

BRIEF DESCRIPTION OF THE DRAWINGS

FIG. 1 is a block diagram illustrating a power generation system configured to recapture by-products according to one embodiment of the present invention.

DETAILED DESCRIPTION

The present invention provides a system and method of re-capturing some of the by-products produced by generating energy. As seen in FIG. 1 and as discussed in the specification, the system that re-captures the by-products is associated with an ethanol-based power generation plant that produces ethanol for fuel. However, this is for illustrative purposes only. The present invention may be used to re-capture and process by-products from other types of power generation plants as well.

FIG. 1 is a block diagram illustrating an ethanol-based power generation plant configured according to one embodiment of the present invention. According to the present invention, the power generation plant is equipped with a Combined Heat, Ice, Power, and Steam (CHIPS) System 10 that re-captures the high heat-exhaust gasses that are produced by burning the ethanol for power, and converts these gasses to hot and cold water for use in an ethanol processing facility 12.

As seen in FIG. 1, the CHIPS system 10 comprises a plurality of conduits that interconnect a pump 14, a Gas Turbine Generator (GTG) 16, a High Temperature Heat Exchanger (HTHE) 18, a steam reservoir 20, a variable pressure regulating valve 22, a thermostatic control valve 24, a Low Temperature Heat Exchanger (LTHE) 26, a hot water reservoir 28, a Heat Absorption Chiller (HAC) 30, and an ice bank 32.

The ethanol processing facility 12 produces ethanol from biomass using methods well-known known in the art. The pump 14 then pumps the ethanol from the processing facility 12 to the GTG 16 at high pressure. Specifically, the pump 14 receives the ethanol at a high volume, but pumps the ethanol to the GTG 16 at a much lower volume. This volume differential compresses the ethanol for delivery to the GTG 16.

The GTG 16 generally comprises three main components—a variable atomizer 16a, a combustion chamber 16b, and a turbine 16c. The variable atomizer 16a mixes the high pressure compressed ethanol together with compressed oxygen and injects the mixture into the combustion chamber 16b. Mixing the ethanol and the oxygen at the variable atomizer 16a creates high temperatures within the combustion chamber 16b, and produces a high air velocity to the fans in turbine 16c. The mixture is ignited within the combustion chamber 16b, and the resulting gasses are directed over the fans in the turbine 16c causing them to spin. As is known in the art, the turbine 16c rotates a shaft, for example, to mechanically generate electricity. The electricity is provided back to the ethanol processing facility 12 to provide for its power needs. All excess power is provided to an external power grid for sale to providers to power homes and businesses.

The GTG 16 produces high heat exhaust gasses. Typically, the temperature of the exhaust gasses is about 1500° F. Rather than allow these hot gasses to exhaust directly to the outside, however, they are captured and filtered by High Temperature Heat Exchanger (HTHE) 18 to produce superheated steam. In one embodiment, the HTHE 18 comprises a flue that exhausts to the exterior of the power generation plant. A coiled pipe 18a extends through the interior of the HTHE 18 and carries water produced by the processing facility 12. The hot exhaust gasses enter the HTHE 18 from the GTG 16 and heat the water running through the coil 18a to convert it to steam. The exhaust gasses are filtered and vented to the outside.

The steam produced by the HTHE 18 has a temperature of about 800° F., and is stored in a high pressure steam reservoir 20. A portion of the steam is supplied on demand to the processing facility 12 via one or more variable pressure regulating valves 22. The other portion of the captured steam, however, is diverted to a closed loop Low Temperature Heat Exchanger (LTHE) 26. The LTHE 26 uses the steam to produce hot water via pressure regulating valves and temperature control devices.

More particularly, a thermostatic control valve 24 is disposed between the steam reservoir 20 and the LTHE 26. The valve 24 modulates the flow of steam coming from the steam reservoir 20 such that the average temperature of the steam entering the LTHE 26 is about 350° F. The heated steam travels through a coil 26a and returns to the steam reservoir 20 in a closed loop. Water from the processing facility is pumped into the LTHE 26 such that it flows around the heated coil 26a. This heats the water such that the LTHE 26 outputs hot water at about 210° F. The hot water is stored in the hot water reservoir 28 and used on demand in the process facility 12. All excess hot water, however, is directed to the Heat Absorption Chiller (HAC) 30, which is designed to keep ice in the ice bank 32 frozen.

More particularly, the HAC 30 is a refrigeration system that utilizes a heat source to provide the energy needed to drive a cooling system instead of electricity to drive a compressor. In FIG. 1, hot water from the hot water reservoir 28 provides the heat source and the ice bank 32, which is full of ice, is the cooling system. In operation, the HAC 30 keeps the ice in the ice bank 32 frozen. Warm water provided by the ethanol processing facility 12 is run through the ice bank 32 to be chilled. The resultant chilled water is then returned to the processing facility 12 for use in the production of ethanol.

By way of example, one embodiment of the present invention runs ammonia through the HAC 30 in a closed loop. The hot water flows around the ammonia-filled tube (not shown) and causes the ammonia to evaporate within the tube. The tube, however, extends from the HAC 30 into the ice bank 32. Therefore, as the tube enters the ice bank 32, the evaporated ammonia within the tube condenses back to a liquid and flows out of the HAC 30. This removes the heat from the ice in the ice bank 32 and keeps the ice in the ice bank 32 frozen. Warm water provided from the processing facility 12 travels through a coil 32a that extends through the ice bank 32. The ice in the ice bank 32 removes the heat from the warm water so that chilled water is pumped back to the processing facility 12 to provide for its cooling needs.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A system for a power generation plant, the system comprising:
   a generator subsystem configured to generate electrical power for a fuel processing facility using fuel received from the fuel processing facility;
   a hot-water subsystem configured to produce hot water for the fuel processing facility using exhaust gasses output by the generator subsystem; and
   a chilled-water subsystem comprising a heat exchanger connected to an absorption chiller, configured to use at least a portion of the hot water produced by the hot water subsystem to chill water for the fuel processing facility.

2. The system of claim 1 wherein the generator subsystem comprises a generator configured to mix the fuel received from the fuel processing facility with a compressed gas, and to ignite the mixture to generate the electrical power.

3. The system of claim 2 further comprising a first pump configured to compress the fuel prior to injecting the compressed fuel into the generator.

4. The system of claim 1 wherein the hot-water subsystem comprises:
   a first heat exchanger configured to convert water received from the fuel processing facility into steam using exhaust gasses received from the generator subsystem;
   a steam reservoir to store the steam produced by the first heat exchanger; and
   a second heat exchanger configured to convert at least a portion of the steam stored in the steam reservoir into hot water using water from the fuel processing facility.

5. The system of claim 4 wherein the hot-water subsystem further comprises:
   a regulator valve configured to selectively provide at least a portion of the steam stored in the steam reservoir to the fuel processing facility; and
   a thermostatic control valve configured to maintain a temperature of the steam entering the second heat exchanger to a predefined temperature.

6. The system of claim 4 wherein the second heat exchanger and the steam reservoir comprise a closed-loop system.

7. The system of claim 4 wherein the temperature of the exhaust gasses entering the first heat exchanger is higher than the temperature of the steam entering the second heat exchanger.

8. The system of claim 4 further comprising a hot water reservoir to store the hot water that is produced by the second heat exchanger and provided to the fuel processing facility.

9. The system of claim 1 wherein the heat exchanger comprises:
   an ice bank to chill water received from the fuel processing facility; and
   a closed-loop conduit to carry the water to be chilled by the ice bank to and from the fuel processing facility.

10. The system of claim 9 wherein the temperature of the water in the closed-loop conduit coming from the fuel processing facility is higher than the temperature of the water in the conduit being returned to the fuel processing facility.

11. A method of recycling the by-products of a power generation plant to produce resources for the power generation plant, the method comprising:
   generating electrical power for a fuel processing facility using a fuel received from the fuel processing facility;
   using exhaust gasses produced from generating the electrical power to produce hot water for the fuel processing facility; and
   using a chilled water subsystem comprising a heat exchanger connected to an absorption chiller, the chilled water subsystem using at least a portion of the hot water produced by the hot water subsystem to chill water for the fuel processing facility.

12. The method of claim 11 further comprising:

compressing the fuel received from the fuel processing facility;

mixing the compressed fuel with a compressed gas; and igniting the mixture to generate the electrical power.

13. The method of claim 11 further comprising:

converting water received from the fuel processing facility into steam using exhaust gasses received from the generator subsystem;

storing the steam in a steam reservoir; and converting at least a portion of the steam stored in the steam reservoir into hot water using water from the fuel processing facility.

14. The method of claim 13 further comprising:

selectively providing at least a portion of the steam stored in the steam reservoir to the fuel processing facility; and operating a thermostatic control valve to maintain a temperature of the steam being converted into hot water at a predefined temperature.

15. The method of claim 13 wherein a temperature of the exhaust gasses used to convert the water received from the fuel processing facility into steam is higher than a temperature of the steam being converted into hot water.

16. The method of claim 13 further comprising storing the converted hot water in a hot water reservoir.

17. The method of claim 11 further comprising:

carrying the water received from the fuel processing center in a closed-loop conduit extending through a heat exchanger;

cooling the water in the conduit using ice; and returning the cooled water in the closed-loop conduit to the fuel processing facility.

* * * * *